United States Patent
Genette et al.

(10) Patent No.: US 6,880,105 B1
(45) Date of Patent: Apr. 12, 2005

(54) MEDIATION DEVICE DEVELOPMENT METHOD

(75) Inventors: Michel José Claude Ghislain Genette, Bovesse (BE); Matthieu Henri De Parades, Jambes (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/442,465

(22) Filed: Nov. 18, 1999

(30) Foreign Application Priority Data

Nov. 19, 1998 (EP) .............................. 98402873

(51) Int. Cl.$^7$ ................................ G06F 11/00
(52) U.S. Cl. ................ 714/26; 714/47; 709/328; 705/80
(58) Field of Search .................. 709/328; 707/102, 707/201; 345/739, 767; 717/11, 7, 4; 705/1, 80; 714/47, 26, 39

(56) References Cited

FOREIGN PATENT DOCUMENTS

| EP | 0 295 760 A2 | 12/1988 |
|----|---|---|
| EP | 0295760 A2 * | 12/1988 |

OTHER PUBLICATIONS

ITU–T Standard Document Q.1213, Oct. 1995, Intelligent Network—Global Functional Plane for Intelligent Network CS–1.

M. C. Pong, "I–Pigs: An Interactive graphical Environment for Concurrent Programming" Computer Journal, vol. 34, No. 4, Aug. 1, 199, pp. 320–330 XP000260979.

* cited by examiner

*Primary Examiner*—Pierre E. Elisca
(74) *Attorney, Agent, or Firm*—Sughrue Mion, PLLC

(57) ABSTRACT

Subject of the present invention is a method to develop a mediation device, which is used to convert first data to second data and vice versa.

This mediation device is developed by using means to create a service which supports the mediation device functionality. This service is created by at first selecting predefined Service Independent Building Blocks, linking this selected predefined Service Independent Building Blocks together in a predefined order to create a service logic and adding subsequently the mediation device specific service data to the predefined Service Independent Building Blocks of the service logic. This last step finalizes the mediation device service. To, finally, realize a mediation device the created service is deployed by processing the service logic together with the service data.

13 Claims, 4 Drawing Sheets

MEDIATION DEVICE DEVELOPMENT METHOD

BACKGROUND OF THE INVENTION

The present invention relates to a method to develop a mediation device to a related system, realising this method and to a mediation device developed according such a method.

Mediation devices are generally known in the art. They perform one or more of the following processes:

Information conversion between information models

Augmenting and enhancing information in the translation process from a local Management Information Base to be compliant with a generic Management Information Base Maintaining the communications context Data translation.

Such a mediation device is generally developed by programming the entire functionality as specified in a, in advance prepared, functional description. This programming is done with one chosen programming language from a number of suitable programming languages on a, in advance chosen, convenient platform, like a UNIX-machine or a PC.

To implement the mediation device according to the functional description, the development of such a device is entirely done from scratch.

This way of producing a mediation device is disadvantageous in the sense that the time-to-market is quite substantial in an environment where short lead-times of product-development are required.

SUMMARY OF THE INVENTION

An object of the present invention is to provide a method to develop a mediation device of the above known type but wherein time needed to develop such a mediation device is reduced significantly.

According to the present invention, this object is achieved by a method to develop a mediation device, to be used to convert first data to second data and vice versa, the method comprising the steps of:

a. creating a service supporting a mediation device functionality by executing the following sub-steps:

a1. selecting predefined Service Independent Building Blocks; and a2. linking said predefined Service Independent Building Blocks together in a predefined order to create a service logic; and a3. adding mediation device specific service data to said predefined Service Independent Building Blocks of said service logic; and b. deploying said service by processing said service logic together with said service data.

In this way, the development of a mediation device is done by selecting and using a number of predefined Service Independent Building Blocks. Because each of the Service Independent Building Blocks provides a part of the entire mediation functionality, a mediation device can be developed significantly faster compared to the development from scratch, by coupling them in such an order that the entire functionality of the mediation device is covered. Moreover such predefined Service Independent Building Blocks can be selected from a repository which makes them reusable.

An additional feature of the present invention is that the selecting of this predefined Service Independent Building Blocks, the linking of the selected predefined Service Independent Building Blocks and/or the adding of mediation device specific service data to each of the selected predefined Service Independent Building Blocks is done via a Service Creation Environment SCE.

This Service Creation Environment SCE usually forms part of an Intelligent Network environment, amongst others comprising a Service Control Point SCP and a thereto belonging Service Creation Environment SCE which are interconnected via a Service Management Point SMP. The Service Creation Environment SCE is a tool with a graphical user interface which includes a repository containing a number of predefined Service Independent Building Blocks which are standardised according to ITU-T standards, for instance the ITU-T standard document Q.1213 "INTELLIGENT NETWORK: GLOBAL FUNCTIONAL PLANE FOR INTELLIGENT NETWORK CS-1", wherein, in the pages 3 up to 34, capability set 1 SIBs are described, and which in this invention are linked together with a number of specially developed Service Independent Building Blocks supporting mediation device functionality. The Service Independent Building Blocks can be selected from the repository, using the graphical user interface, to create a service logic. The graphical representation of the Service Independent Building Blocks, in the form of icons, facilitates an easy and surveyable service logic creation.

Another feature of the present invention is that the selecting of the predefined Service Independent Building Blocks, the linking of the selected predefined Service Independent Building Blocks and/or the adding of mediation device specific service data to each of the selected predefined Service Independent Building Blocks is done via a Command Handling Interface.

This Command Handling Interface also usually forms part of an Intelligent Network environment as described before. This Command Handling Interface which is in an Intelligent Network environment also coupled to the Service Control Point SCP is an alternative interface enabling to select the predefined Service Independent Building Blocks via commands, each command representing the selection of one single predefined Service Independent Building Block. The Service Independent Building Blocks can again be selected from the repository, using this command handling interface, to create a service logic. This interface forms an interface which is more direct and has shorter reponse-time for each performed action compared to using a Service Creation Environment SCE.

As a result of the achievement of the earlier mentioned object also a system realising the subject method and a device developed according to the method is obtained.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

Figure 1:
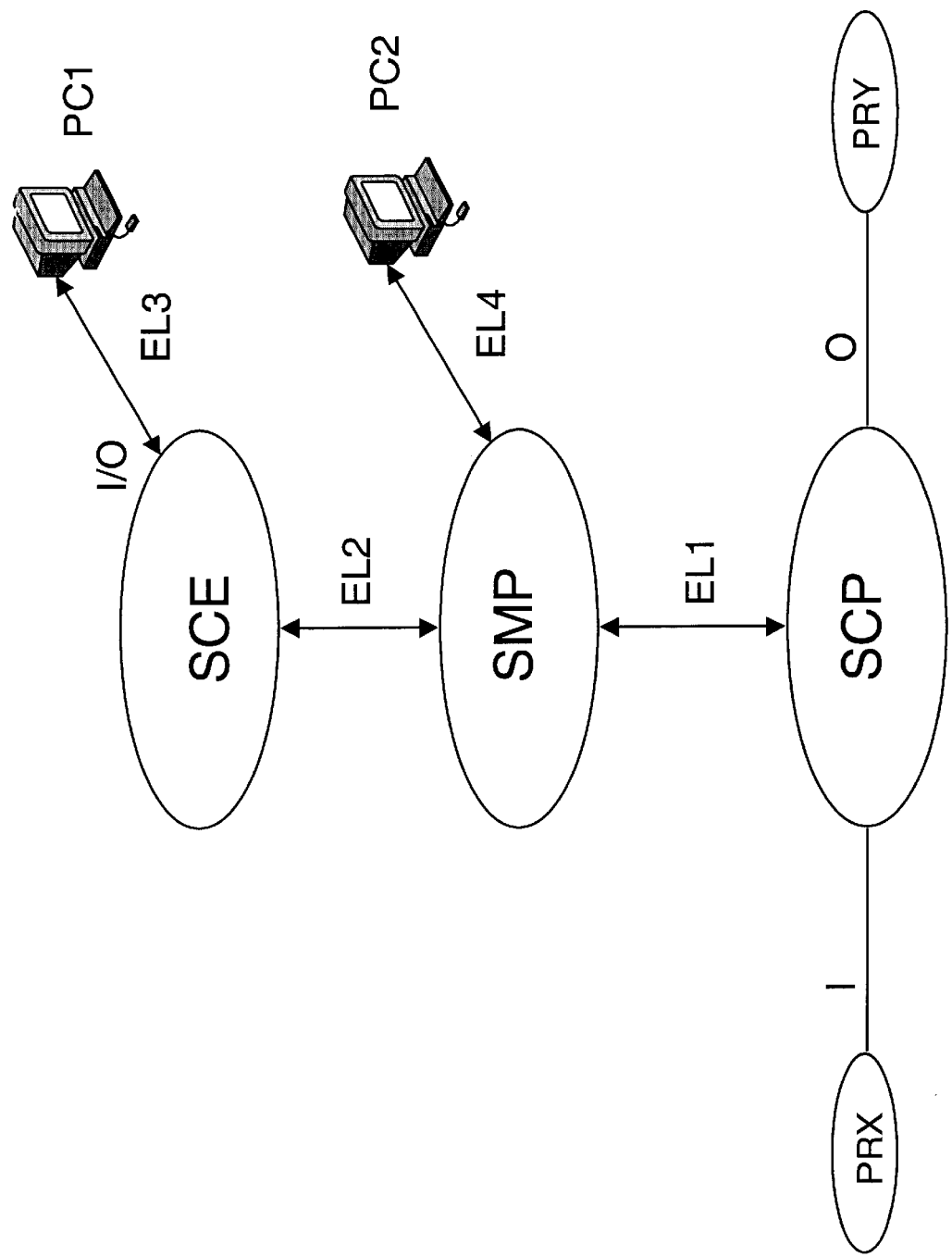
FIG. 1 which represents an embodiment of a mediation device development system in an Intelligent Network environment.

In the following paragraphs, referring to the drawings in the respective figures FIG. 1, FIG. 2 and FIG. 3, a number of elements, forming part of an Intelligent Network, used for the execution of the creation of a mediation device according to the present invention, is described.

DETAILED DESCRIPTION OF THE INVENTION

In the first paragraph only the relevant components of the Intelligent Network and its relevant means are described. In the second paragraph the interconnections between all elements are defined and in a later paragraph the actual execution of the mediation device creation method is described by globally elaborating the development of a specific mediation device.

The main elements of the described embodiment are the following Intelligent Network elements: a Service Creation Environment SCE together with a Personal Computer PC1, a Service Management Point SMP together with a personal Computer PC2 and, the Service Control Point SCP, ethernet-LANs EL1, EL2, EL3 and EL4, connected to the embodiment are mediated devices PRY and PRX which are to be mediated by the mediation device.

The Service Creation Environment SCE is coupled to the Service Management Point SMP via a bi-directional ethernet-LAN, EL2. The Service Management Point SMP on its turn is coupled to the Service Control Point SCP again via a bi-directional ethernet-LAN, EL1.

The Personal Computers PC1 is coupled to an Input/Output-terminal I/O of the Service Creation Environment SCE via ethernet-LAN EL3. The Personal Computer PC2 is coupled to the Service Management Point SMP via the ethernet-LAN EL4. The Service Control Point SCP is connected to both Mediated Devices PRX and PRY via a respective input-terminal I and the Output-terminal O. The first mentioned element, the Service Creation Environment SCE is used to create a service logic performing the functionality of a mediation device which can for instance realise a protocol-conversion. The structure of the Service Creation Environment SCE is presented in FIG. 2. This Service Creation Environment SCE is built up of a creation means CRM, a deploying means DEM and a Database DB1. The creation means CRM, which enables to create a service logic using a graphical user interface, exists of a selecting means SEM adapted to select the Service Independent Building Blocks in the following referred to as SIB, from a provided repository or library. Other elements, of the service Creation Means CRM are a linking means LIM which takes care of the connecting of all selected SIBs and the Data Adding Means DAM which is used to add mediation device specific data to each SIB. The deploying means DEM takes care of the processing of the service logic together with the mediation device specific service data. The graphical user interface of the Service Creation Environment SCE is executed on the Personal Computer PC1.

Referring to the drawing in FIG. 2, the interconnections within the Service Creation Environment SCE are described in the following. At first the Personal Computer PC1 is connected via ethernet LAN EL3 to Input/Output I/O terminal of the Service Creation Environment SCE.

Selecting means SEM is coupled to the Linking means LIM via a bi-directional link and the Linking means LIM on its turn is coupled to the Data Adding means DAM, again via a bi-directional link. All three means of the creating Means CRM together with Deploying means DEM are coupled to database DB1 via the respective bi-directional communications links. They are also coupled to Input/Output terminal I/O of the Service Creation Environment SCE. The library means LBM is coupled to the selecting means SEM.

Figure 2:
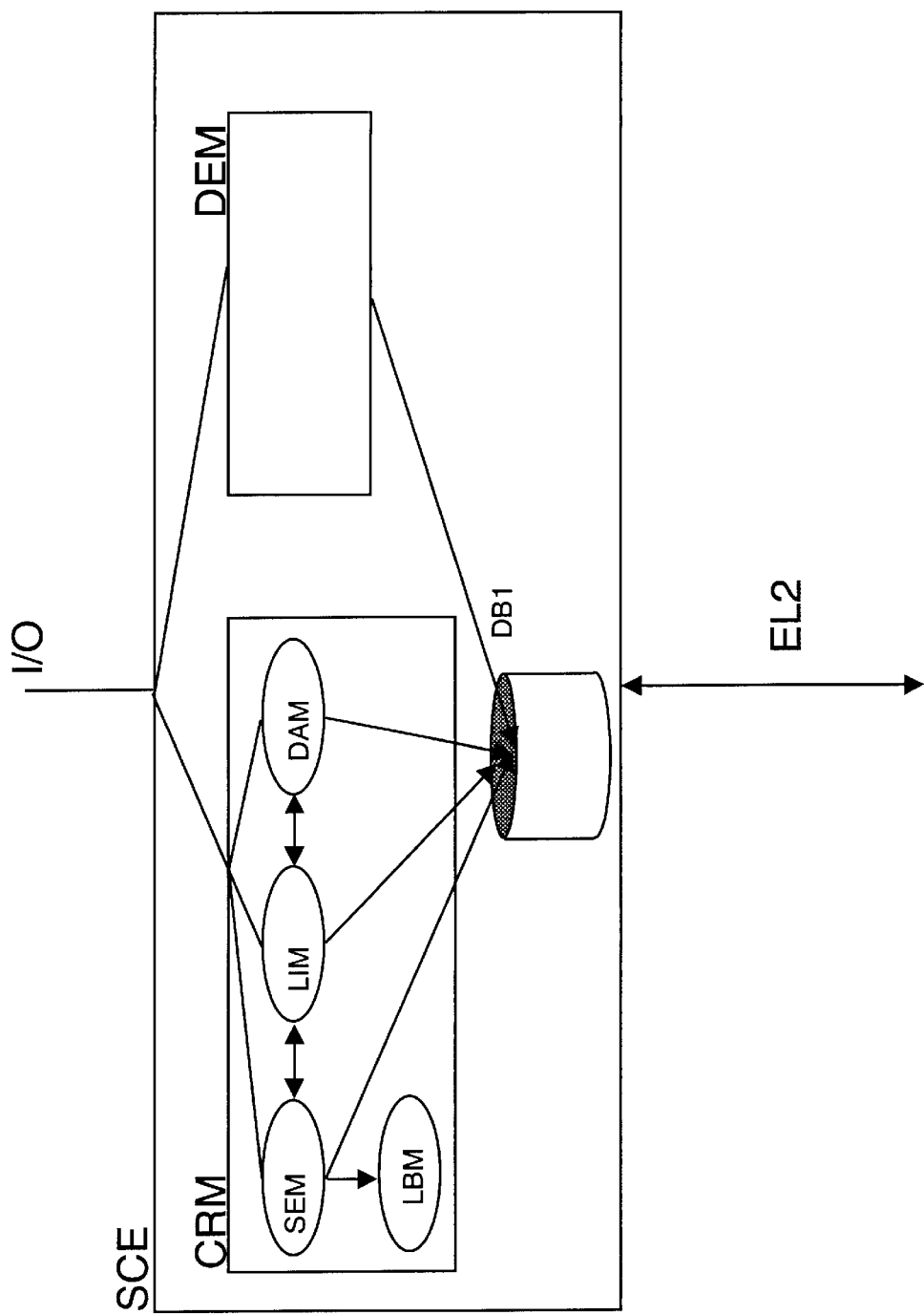
FIG. 2 represents the Service Creation Environment SCE of FIG. 1.

The Service Management Point SMP of FIG. 1, further called SMP, in this embodiment, takes care of the service management function, like management concerning the service independent Intelligent Network platform, management of operator access and management of the service.

Although this is not essential for the present invention the SMP may also include a database which contains all data needed for the mediation device service. Based on this database the SMP takes care of its service management functionality.

Figure 3:
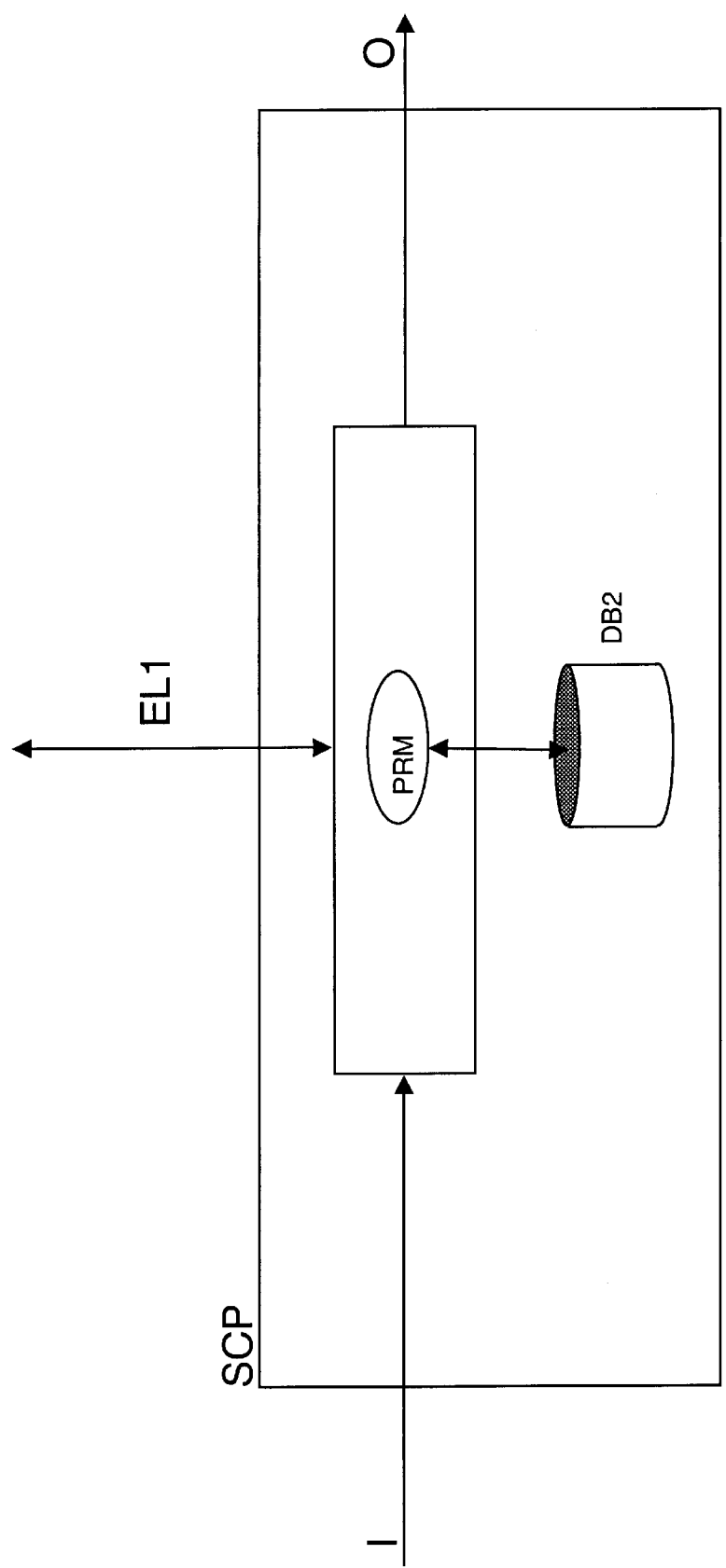
FIG. 3 represents the Service Control Point SCP of FIG. 1.

Another important element of the current embodiment is the SCP, shown in FIG. 3, which processes the installed service logic together with the mediation device specific data. The SCP contains a processing means PRM which provides a framework in which service scripts can be introduced and interpreted. Both the service logic and service specific data are stored in the belonging database DB2.

Referring to the drawing in FIG. 3, the interconnections within the Service Control Point SCP are described in the following.

The Service Control Point SCP has an external input-terminal I which is also an input-terminal of the processing means PRM and is coupled to mediated device PRX. This same processing means has an output-terminal O which is also an external output-terminal of the Service Control point SCP and is coupled to mediated device PRY. The processing means PRM is also coupled to the database DB2, via a bi-directional link.

In order to explain the operation of the present invention it is assumed that a functional description of a mediation device is present and that the main task of this mediation device is, as described in that functional description, the getting and reading of messages from a queue of mediated device PRX. The messages are deposited in that queue by mediated device PRX. The mediation device gets the message, translates it in a format suitable for the other mediated device PRY and forwards this translation. A reply is formulated by mediated device PRY and sent subsequently to the mediated device PRX. This received messages, the reply messages, are to be put in a reply-queue of mediated device PRX by the mediation device. Mediated device PRX then gets the replies then from the reply-queue.

This mediation device is realised by creating an Intelligent Network service logic using the Intelligent Network Service Creation Environment SCE. This Service Creation Environment SCE provides a set of Service independent Building blocks which are standardised and present together with a set of Service independent Building Blocks SIBs additionally created to support specific mediation device functionality.

Figure 4:
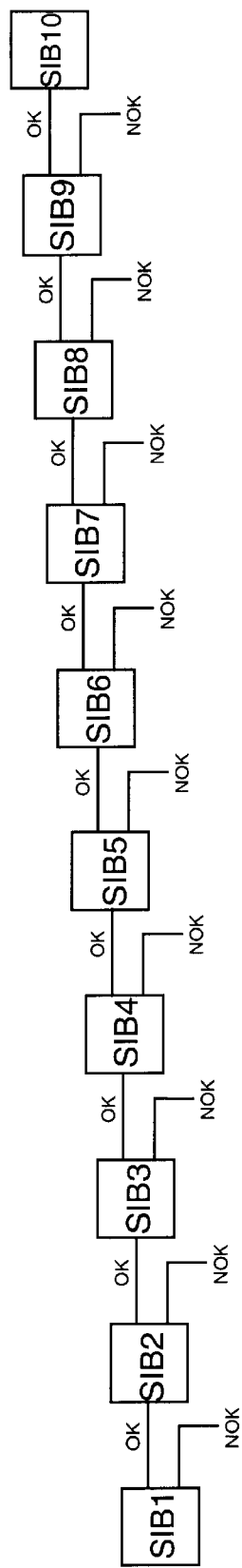
FIG. 4 represents a related mediation device service logic.

At first a graphical service creation tool, which is executed on Personal Computer PC1, based on the selecting means and linking means is used to create the service logic to perform the functionality as specified in the functional description. This service creation tool also provides the library LBM of SIBs from which they can be selected to create the service logic of the mediation device. Then the service logic creation starts by selecting the following SIBs and connect them in the order in which they are listed as shown in FIG. 4:

SIB1 performing the login on mediated device PRY

SIB2, initialising the communications interface of mediated device PRY

SIB3 establishing a connection between the mediation device and the mediated device PRX SIB4 waiting for a message coming in at the queue of mediated device PRX.

SIB5 sending a statistical event to mediated device PRY in case a new message arrives at the queue of mediated device PRX SIB6 getting message from the message queue at mediated device PRX SIB7 opening a mediation transaction at mediated device SIB8 performing the actual mediation; which in this situation means: reading, analysing and translating the PRX message into a PRY format and sending the message in PRY format to mediated device PRY. Afterwards the message is answered by mediated device PRY. The answer is handed over to the mediation device.

SIB9 sending a reply message towards mediated device PRX

SIB10 jumping back to SIB4.

After selecting all these SIBs and linking each of them, with linking means LIM, in the described order and performing an initialisation of the corresponding parameters of each SIB, using the selecting means SEM, the main service logic as presented in the drawing FIG. 4 is realised. Actually this is only the main flow providing the main mediation device functionality. The handling of error-situations and exception-situations is not included in the presented service logic in order to prevent from unnecessary complexity. All SIB-outlets marked with the text "NOK", meaning Not Ok and handling a situation which is different from the normal flow. Each outlet, marked with OK indicates the normal flow.

Subsequently the mediation device specific data is added using the data adding means DAM of the same graphical tool. This data is necessary to adapt the service logic to the specific environmental elements like the mediated devices PRX and PRY. Examples of used mediation device specific data are amongst others the time it is waited for a new message, the jump address of SIB10 or the device-addresses of mediated devices.

When the mediation device specific data is added to the service logic the mediation device service is created. This service is deployed by the deploying means DEM of the Service Creation Environment SCE together with the processing means of the Service Control Point SCP. This is done via the Service Management Point SMP. The service is installed in the database DB2 of the Service Control Point SCP, and subsequently activated in the Service Control Point SCP.

When the installed mediation device service is activated at Service Control Point SCP, the Service Control Point SCP comes into operation and is then ready to handle its mediation device functionality.

An advantage of using the Intelligent Network platform is that this platform contains a number of platform features such as statistics systems, alarms management, access supervision, which are mainly handled by the Service Management point SMP. All those features are also provided via Graphical user interfaces, potentially based on JAVA and so accessible via the WEB.

The SCE concept allows the designer to use all those features without the need to develop them especially. For example the sending of a statistical ticket or an alarm which is introduced in the logic a by SIBs dedicated hereto, this function is supported by the IN platform.

Instead of using the graphical tool for service creation it is also possible to use a command handling interface wherein the same service creation as performed in the previous description can be realised by using commands each representing a step in service creation as described before. Hereto the Personal Computer PC2 is connected to the Service Management Point SMP via ethernet-LAN EL4.

It has to be remarked that although this embodiment, is based on an Intelligent Network implementation, the method of the present invention is not restricted to such an environment and may for instance be implemented in an analogous way to provide a stand-alone mediation device running on a SCP-like device together with a SMP-like device in order to provide an analogue of the SMP management functionality.

Although the above embodiments of the invention have been described by means of functional blocks, their detailed realisation based on their functional description should be obvious for a person skilled in the art and is therefore not described.

While the principles of the invention have been described above in connection with specific apparatus, it is to be clearly understood that this description is made only by way of example and not as a limitation on the scope of the invention, as defined in the appended claims.

What is claimed is:

1. A method to develop a mediation device of an intelligent network, to be used in a service control point to convert first data to second data and vice versa, comprising:

creating a service supporting a mediation device functionality; and deploying said service in said service control point by processing a service logic together with service data;

wherein said creating of said service supporting said mediation device functionality comprises:

selecting predefined Service Independent Building Blocks, linking said predefined Service Independent Building Blocks together in a predefined order to create said service logic, and adding mediation device specific service data to said predefined Service Independent Building Blocks of said service logic.

2. The method according to claim 1, wherein at least one of said selecting of predefined Service Independent Building Blocks, said linking of said predefined Service Independent Building Blocks together in a predefined order to create a service logic and said adding of mediation device specific service data to said predefined Service Independent Building Blocks of said service logic is done via a Service Creation Environment.

3. The method according to claim 1, wherein at least one of said selecting of predefined Service Independent Building Blocks, said linking of said predefined Service Independent Building Blocks together in a predefined order to create a service logic and said adding of mediation device specific service data to said predefined Service Independent Building Blocks of said service logic is done via a Command Handling Interface.

4. The method as set forth in claim 1, wherein said service logic includes requests pertaining to a service management point of the intelligent network for performing network functions of the service logic.

5. A mediation device development system for developing a mediation device of an intelligent network, to be used in a service control point to convert first data to second data and vice versa, comprising:

service creation means, adapted to create a service supporting a mediation device functionality; and service deploying means, coupled with an input to an output of said service creation means, and adapted to deploy said service in said service control point by processing service logic together with service data;

wherein said service creation means comprises:

selecting means, coupled with a database adapted to select predefined Service Independent Building Blocks, linking means, coupled with an input to an output of said selecting means and adapted to link said predefined Service Independent Building Blocks together in a predefined order to create said service logic, and data adding means, coupled with an input to an output of said linking means and adapted to add mediation device specific service data to ones of said predefined Service Independent Building Blocks of said service logic.

6. The mediation device development system according to claim 5, wherein at least one of said selecting means, said linking means and said data adding means is comprised in a Service Creation Environment.

7. The mediation device development system according to claim 5, wherein at least one of said selecting means, said linking means and said data adding means is comprised in a Command Handling Interface.

8. The mediation device development system according to claim 5, wherein said selecting means, said linking means, said data adding means and said deployment means are coupled through bi-directional link to a database located in a Service Creation Environment.

9. The mediation device development system according to claim 8, wherein said Service Creation Environment is coupled to a service management point with a separate database and processing means.

10. The mediation device development system as set forth in claim 5, wherein said service logic includes requests to a service management point of the intelligent network for performing network functions of the service logic.

11. A service control point, comprising:

a mediation device converting first data of a first mediated device from a first communication protocol to second data for a second mediated device in a second indication protocol and vice versa; and processing means implementing said mediation device;

said mediation device comprising a service logic having a number of linked predefined Service Independent Building Blocks; and said processing means implementing said mediation device by processing said service logic together with corresponding mediation device specific service data.

12. The service control point according to claim 11, wherein each of said Service Independent Building Blocks has a normal flow outlet and a separate error-handling outlet for handling a situation different from said normal flow.

13. The service control point as set forth in claim 11, wherein said service logic includes requests to a service management point of an intelligent network for performing network functions of the service logic.

* * * * *